United States Patent
Kells et al.

(10) Patent No.: US 10,003,092 B2
(45) Date of Patent: Jun. 19, 2018

(54) COOLANT FLUID FEED TO FUEL CELL STACKS

(71) Applicant: Intelligent Energy Limited, Loughborough (GB)

(72) Inventors: Ashley James Kells, Loughborough (GB); Pratap Rama, Loughborough (GB); Paul Leonard Adcock, Loughborough (GB); Simon Edward Foster, Loughborough (GB); Jonathan Cole, Loughborough (GB); Emma Farndon, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 449 days.

(21) Appl. No.: 14/428,918

(22) PCT Filed: Sep. 16, 2013

(86) PCT No.: PCT/GB2013/052415
§ 371 (c)(1),
(2) Date: Mar. 17, 2015

(87) PCT Pub. No.: WO2014/045018
PCT Pub. Date: Mar. 27, 2014

(65) Prior Publication Data
US 2015/0236361 A1  Aug. 20, 2015

(30) Foreign Application Priority Data
Sep. 18, 2012 (GB) .................................. 1216635.1

(51) Int. Cl.
*H01M 8/04007* (2016.01)
*H01M 8/04029* (2016.01)
(Continued)

(52) U.S. Cl.
CPC ..... *H01M 8/04074* (2013.01); *H01M 8/2485* (2013.01)

(58) Field of Classification Search
None
See application file for complete search history.

(56) References Cited

U.S. PATENT DOCUMENTS 4,582,765 A   4/1986  Kothmann
5,677,073 A *  10/1997  Kawatsu ........... H01M 8/04223
                                                 204/265
(Continued)

FOREIGN PATENT DOCUMENTS

EP    0692835        1/1996
JP    S58-035876 A   3/1983
(Continued)

OTHER PUBLICATIONS

Great Britain Patent Application No. 1216635.1; Search Report; dated Nov. 29, 2012; 4 pages.
(Continued)

*Primary Examiner* — Yoshitoshi Takeuchi
(74) *Attorney, Agent, or Firm* — Baker & Hostetler LLP (57) ABSTRACT

A fuel cell stack assembly has a plurality of cells each having a fluid coolant conduit. A coolant feed manifold has a first inlet and a second inlet and is coupled to each fluid coolant conduit for distribution of fluid coolant within each cell. A pump is coupled for delivery of fluid coolant to the coolant feed manifold through the first and second inlets. A flow control assembly is configured to periodically modify the relative flow rates of fluid coolant through the first and second inlets so that stagnant regions in the coolant feed manifold are avoided. The flow control assembly may also be adapted to periodically interrupt the flow path between the pump and the manifold such that the fluid coolant is (Continued)

delivered to the manifold intermittently, thereby enabling low water flows below a minimum set point of the pump.

14 Claims, 4 Drawing Sheets

(51) Int. Cl.
*H01M 8/04291* (2016.01)
*H01M 8/04298* (2016.01)
*H01M 8/043* (2016.01)
*H01M 8/04313* (2016.01)
*H01M 8/0438* (2016.01)
*H01M 8/04492* (2016.01)
*H01M 8/04694* (2016.01)
*H01M 8/2485* (2016.01)

(56) References Cited

U.S. PATENT DOCUMENTS

| | | |
|---|---|---|
| 7,235,319 B2 | 6/2007 | Kormann et al. |
| 2002/0146608 A1 | 10/2002 | Yang et al. |
| 2003/0152816 A1 | 8/2003 | Hoch |
| 2004/0142217 A1 | 7/2004 | Couch et al. |
| 2005/0120731 A1* | 6/2005 | Lamont ............ H01M 8/04029 62/259.2 |
| 2005/0130005 A1 | 6/2005 | Saito et al. |
| 2006/0035126 A1 | 2/2006 | Kurrle et al. |
| 2007/0178342 A1 | 8/2007 | Hoch |
| 2012/0040260 A1 | 2/2012 | Morita et al. |
| 2012/0251909 A1* | 10/2012 | Narasimhamurthy H01M 8/04134 429/429 |

FOREIGN PATENT DOCUMENTS

| | | |
|---|---|---|
| JP | 08-031442 A | 2/1996 |
| JP | H0811231 | 4/1996 |
| JP | 2005-518077 A | 6/2005 |
| JP | 2006-079880 A | 3/2006 |
| WO | WO 2011/037553 A1 | 3/2011 |
| WO | WO 2011/132044 A1 | 10/2011 |

OTHER PUBLICATIONS

International Patent Application No. PCT/GB2013/052415; Int'l Preliminary Report on Patentability; dated Apr. 2, 2015; 8 pages.
International Search Report dated Jan. 24, 2014, issued in International patent application PCT/GB/2013/052415.

* cited by examiner

COOLANT FLUID FEED TO FUEL CELL STACKS

CROSS-REFERENCE TO RELATED APPLICATIONS

This patent application is a Continuation of International patent application PCT/GB2013/052415 filed Sep. 16, 2013, which claims priority to Great Britain patent application GB1216635.1 filed Sep. 18, 2012, the disclosures of which are incorporated by reference in their entirety.

The present invention relates to electrochemical fuel cells disposed in a stack formation, and in particular to cooling systems for such fuel cell stacks.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion transfer membrane, also known as a proton exchange membrane (PEM), within a membrane-electrode assembly (MEA), with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack is formed comprising a number of MEAs electrically arranged in series. Each MEA is provided with separate anode and cathode fluid flow paths. The anode and cathode fluid flow paths respectively deliver fuel and oxidant to the membrane. The fuel cell stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached, to avoid damage to the fuel cells. Cooling may be achieved at least in part by the delivery of water to individual cells in the stack in either the anode fluid flow paths (which serves to hydrate the anode) and/or in the cathode fluid flow path which combines with reactant water. In each case, evaporative cooling of the fuel cells can occur.

In a typical arrangement, the cooling water is injected into the anode or cathode fluid flow channels from one or more common manifolds extending down the side of the fuel cell stack. A potential problem arises from the flow rates of water within such manifolds. Water may be fed into an inlet at one end of the manifold from which it is fed into individual cells in the stack. This results in a reduction in water flow rate along the manifold away from the inlet. If, for example, a 100 cell stack requires a flow of 100 ml/min delivered at one end of the stack, the flow rate in the manifold at the first cell will be 100 ml/min; after the 50th cell the flow rate in the manifold may be approximately 50 ml/min, and at the final cell the flow rate in the manifold may be only 1 ml/min. Such very low flows, e.g. 1 ml/min, in the manifold can lead to reliability problems for a fuel cell stack. Problems can occur in regions of stagnant or near stagnant flow due to increased corrosion risk, particularly when using deionised water, and an increased risk of build up of bacteria.

A further potential problem with the delivery of water to a fuel cell stack, particularly for evaporative cooling as discussed above, is that the overall water flow rate required is a function of current demand on the fuel cell. For low stack currents, the water flow requirements can be quite low. Water pumps that provide the water flow should be capable of reliably delivering an appropriate flow rate even at low flows. Some water pumps have a minimum bottom stop (i.e. a minimum flow rate) above that which may be desired for fuel cell stack operation at low currents. Running at low current and higher water flow than necessary can cause fuel cells to flood prematurely. Then, when current demand rises and the cells are under load, stack performance is limited. As fuel cell stacks increase in size, it can be increasingly difficult to achieve the required range of high to low water flow rates, and many pumps cannot achieve the required large turndown ratio, i.e. the ratio of required maximum to minimum water flow rates.

It is an object of the invention to provide a solution to at least one or more of the above problems. It is an object of the invention to reduce or eliminate problems that can arise from very low flows in a water distribution manifold. It is an object of the invention to provide a solution for maintaining appropriate cooling water flow levels at both high and low current demand on the fuel cell stack.

According to one aspect, the invention provides a fuel cell stack assembly comprising:
  a plurality of cells each having a fluid coolant conduit;
  a coolant feed manifold having a first inlet and a second inlet and further being coupled to each fluid coolant conduit for distribution of fluid coolant within each cell;
  a pump coupled for delivery of fluid coolant to the coolant feed manifold through the first and second inlets; and
  a flow control assembly configured to periodically modify the relative flow rates of fluid coolant through the first and second inlets.

The flow control assembly may be configured to periodically vary a fluid pressure balance point within the manifold between the first inlet and the second inlet. The flow control assembly may include at least a first variable flow restrictor between the pump and the first inlet, the first variable flow restrictor configured to adjust the impedance to fluid coolant flow between the pump and the first inlet. The flow control assembly may include a second variable flow restrictor, the second variable flow restrictor configured to adjust the impedance to fluid coolant flow between the pump and the second inlet. The flow control assembly may comprise a multi-way valve disposed between the pump and the manifold which is configured to periodically switch between directing fluid coolant through the first inlet and through the second inlet. The flow control assembly may be adapted to periodically reconfigure flow paths between the pump and the first and second inlets between a first configuration in which fluid flow from the pump is predominantly directed to the first inlet and a second configuration in which fluid flow from the pump is predominantly directed to the second inlet. The flow control assembly may comprise at least two variable flow restrictors configured to periodically alternate the dominant flow of coolant fluid through the first and second inlets. The flow control assembly may comprise: a first flow path, between the pump and the first inlet, having a first impedance to coolant flow; a second flow path, between the pump and the second inlet, having a second impedance to coolant flow, in which the first impedance is different to the second impedance; and a controller for varying the overall flow volume of water delivered to the manifold through both the first and second flow paths such that a water pressure balance point within the manifold is varied between the first inlet and the second inlet. The controller for varying the overall volume of water delivered to the manifold may comprise any one or more of: a pump controller for varying the pump speed; a variable flow restrictor in a portion of flow path which is common to both the first flow path and the second flow path; and a stack controller controlling operational parameters of the fuel cell stack. At least one of the first and second impedances may be variable by a variable flow restrictor. The first and second inlets may be respectively proximal to a first end and a second end of the stack. The fuel cell stack assembly may include a switchable drain between the pump and at least one of the first and second inlets configured to periodically divert at least a portion of the coolant fluid provided by the pump to a drain. The switchable drain may comprise a multi-way valve disposed in a flow path between the pump and the first and second inlets, the multi-way valve being configured to switch between coupling a) the first inlet; b) the second inlet; and c) a drain line, to the pump. The switchable drain may comprise a multi-way valve disposed in a flow path between the pump and at least one of the first and second inlets. The drain may be coupled to a recirculation system for returning at least a portion of the coolant fluid to the pump. The pump may comprise a first pump and a second pump, the first pump coupled for delivery of fluid coolant to the coolant feed manifold through the first inlet and the second pump coupled for delivery of fluid coolant to the coolant feed manifold through the second inlet, and in which the flow control assembly comprises a controller configured to operate the first and second pumps at differential rates.

According to another aspect, the invention provides a fuel cell stack assembly comprising:
  a plurality of cells each having a fluid coolant conduit;
  a coolant feed manifold having at least a first inlet and further being coupled to each fluid coolant conduit for distribution of fluid coolant within each cell;
  a pump coupled to the first inlet for delivery of fluid coolant to the coolant feed manifold by a flow path; and
  a flow control assembly between the pump and the manifold adapted to periodically interrupt the flow path between the pump and the manifold such that the fluid coolant is delivered to the manifold intermittently.

The flow control assembly may comprise a multi-way valve configured to switch the output of the pump between the at least first inlet and a drain. The coolant feed manifold may include a second inlet coupled to the pump for delivery of fluid coolant to the coolant feed manifold through the second inlet; and the flow control assembly may comprise a multi-way valve configured to switch the output of the pump to any one of i) the first inlet; ii) the second inlet; and iii) a drain. The drain may be coupled to a recirculation system for returning cooling fluid to an inlet of the pump. The coolant feed manifold may include a second inlet also coupled to the pump for delivery of fluid coolant to the coolant feed manifold, and the flow control assembly may be configured to periodically modify the relative flow rates through the first and second inlets. The flow control assembly may comprise a multi-way valve configured to switch the output of the pump between the at least first inlet and a dead end. The coolant feed manifold may further include a second inlet coupled to the pump for delivery of fluid coolant to the coolant feed manifold through the second inlet; and the flow control assembly may comprise a multi-way valve configured to switch the output of the pump between i) the first inlet; ii) the second inlet; and iii) a dead end. The fuel cell stack assembly may include a controller for switching the assembly between a first mode of operation in which fluid coolant is delivered to the manifold continuously and a second mode of operation in which fluid coolant is delivered to the manifold intermittently.

According to another aspect, the invention provides a fuel cell stack assembly comprising:
  a plurality of cells each having a fluid coolant conduit;
  a coolant feed manifold having at least a first inlet and further being coupled to each fluid coolant conduit for distribution of fluid coolant within each cell;
  a pump coupled to the first inlet for delivery of fluid coolant to the coolant feed manifold by a flow path; and
  a flow control assembly between the pump and the manifold configured to periodically reconfigure the flow path to divert at least a proportion of the fluid coolant to a drain.

The drain may be coupled to a recirculation system for returning cooling fluid to an inlet of the pump. The coolant feed manifold may include a second inlet also coupled to the pump for delivery of fluid coolant to the coolant feed manifold, and the flow control assembly may be configured to periodically modify the relative flow rates through the first and second inlets.

According to another aspect, the invention provides a method of operating a fuel cell stack assembly comprising the steps of:
  supplying fluid coolant to a fluid coolant conduit in each of a plurality of cells in the fuel cell stack assembly via a coolant feed manifold having a first inlet and a second inlet and being coupled to each fluid coolant conduit for distribution of the fluid coolant within each cell;
  pumping the fluid coolant into the coolant feed manifold through the first and second inlets; and
  periodically modifying the relative flow rates of the fluid coolant through the first and second inlets using a flow control assembly.

According to another aspect, the invention provides a method of operating a fuel cell stack assembly comprising the steps of:
  supplying fluid coolant to a fluid coolant conduit in each of a plurality of cells in the fuel cell stack assembly via a coolant feed manifold having at least a first inlet and being coupled to each fluid coolant conduit for distribution of the fluid coolant within each cell;
  pumping the fluid coolant into the first inlet, by way of a flow path, for delivery of the fluid coolant to the coolant feed manifold; and
  periodically interrupting the flow path using a flow control assembly between the pump and the manifold such that the fluid coolant is delivered to the manifold intermittently.

According to another aspect, the invention provides a method of operating a fuel cell stack assembly comprising the steps of:
  supplying fluid coolant to a fluid coolant conduit in each of a plurality of cells in the fuel cell stack assembly via a coolant feed manifold having at least a first inlet and being coupled to each fluid coolant conduit for distribution of the fluid coolant within each cell;
  pumping the fluid coolant into the first inlet, by way of a flow path, for delivery of the fluid coolant to the coolant feed manifold; and
  periodically reconfiguring the flow path between the pump and the manifold using a flow control assembly to divert at least a proportion of the fluid coolant to a drain.

Each of the methods defined above may be adapted to include the specific methods performed by the apparatus defined above.

Embodiments of the present invention will now be described by way of example and with reference to the accompanying drawings in which.

Figure 1:
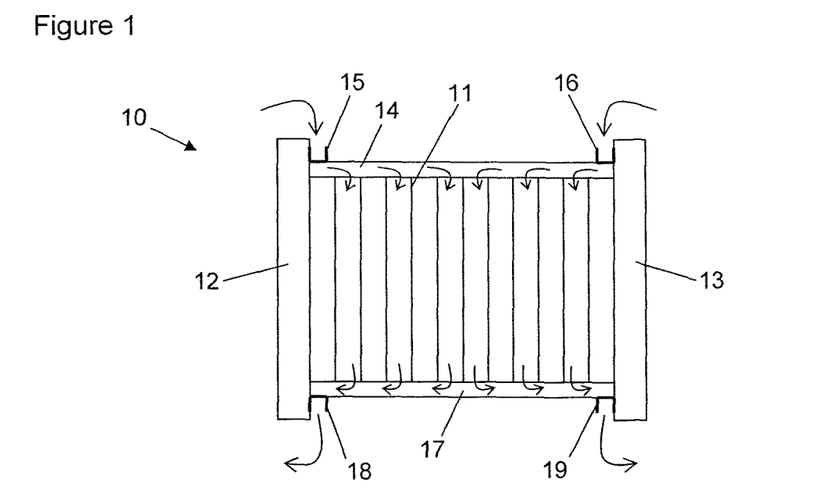
FIG. 1 is a schematic side view of a fuel cell stack with water delivery manifold.

FIG. 1 shows a schematic side view of a fuel cell stack 10 suitable for use with the present invention. The stack 10 comprises a plurality of fuel cells 11 each of which has an anode fluid flow path for delivering fuel to an anode surface of a membrane-electrode assembly and a cathode fluid flow path for delivering oxidant to a cathode surface of a membrane-electrode assembly. The fuel cells are held in a stack arrangement by way of end plates 12, 13 in known manner. The anode fluid flow paths or the cathode fluid flow paths are provided with water injection for evaporative cooling of the fuel cell stack by way of a manifold or gallery 14 which extends down the length of the stack between a first inlet 15 and a second inlet 16 at opposing ends of the manifold 14. As indicated by the arrows in FIG. 1, water flows into the manifold from each of the inlets 15, 16, and then into each of the fluid flow paths of the separate fuel cells 11. Preferably, the water combines with the fuel or oxidant flow at some point between the water manifold 14 and flow channels in the individual fuel cells 11, which flow channels extend across the active surfaces of the fuel cells. The fuel and oxidant may be introduced into the individual cells using a separate fuel manifold and a separate oxidant manifold using known techniques. Preferably, unused fuel or oxidant and any excess water pass out of the fuel cells into an exhaust manifold 17 and from there to one or more exhaust ports 18, 19. An exhaust manifold is not necessarily required for the anode fluid flow paths if all fuel is consumed at the active surfaces of the fuel cells, particularly if water injection is not provided on the anode sides of the fuel cells, although an anode exhaust line may be provided for periodic purging.

Figure 2:
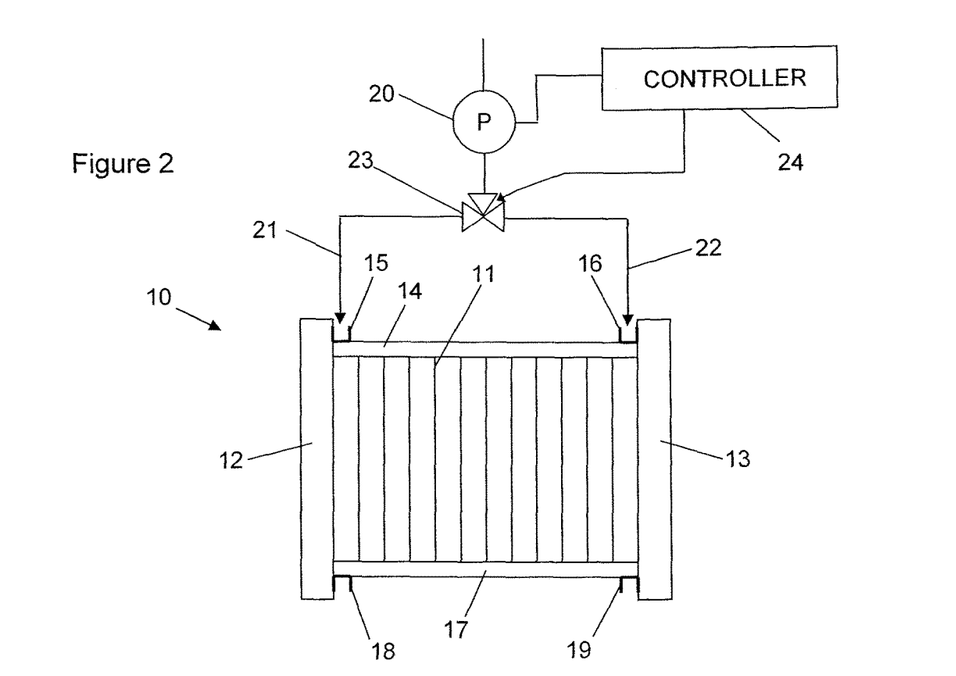
FIG. 2 is a schematic view of the fuel cell stack of FIG. 1 coupled for two-way water delivery to the manifold.

FIG. 2 shows a first arrangement of fuel cell stack assembly in which a cooling water pump 20 is coupled to the fuel cell stack 10 by way of a first flow path 21 and a second flow path 22 and a multi-way valve 23. The first flow path 21 is coupled to the first inlet 15 to deliver cooling water into the manifold 14 at a first end, and the second flow path 22 is coupled to the second inlet 16 to deliver cooling water into the manifold 14 at the other end. The multi-way valve 23 is operative to select one or other of the flow paths 21, 22 for delivery of water into the manifold 14. A controller 24 is operable to periodically switch the multi-way valve 23 so that cooling water enters the manifold 14 from alternating ends. The switching of the multi-way valve 23 by the controller 24 may be performed according to any suitable algorithm, e.g. on a timed basis, and/or as a function of cooling flow rate required by the fuel cell stack 10. For example, switching could be less frequent when high coolant flows are required, and more frequent when very low flows are required.

In this way, the assembly of FIG. 2 generally provides a flow control assembly 21, 22, 23, 24 which is configured to periodically modify the relative flow rates through the first and second inlets 15, 16. In a first configuration, when the multi-way valve 23 diverts coolant water through the first flow path 21, the flow rate through the first inlet 15 is 100% of total flow, while the flow rate through the second inlet 16 is 0% of total flow. When the multi-way valve 23 diverts coolant water through the second flow path 22, the flow rate through the first inlet 15 is 0% of total flow, while the flow rate through the second inlet 16 is 100% of total flow. In this way, the low coolant flow end of the manifold is periodically reversed. More generally, the assembly of FIG. 2 provides a valve assembly 23 disposed between the pump 20 and the manifold 14 which is configured to periodically switch between directing fluid coolant through the first inlet and through the second inlet. A similar result can be achieved with a shut off valve in each of the first and second flow paths 21, 22 operating together (in opposition). A similar result can be achieved with a variable flow restrictor positioned in each of the first and second flow paths 21, 22 operating together (in opposition). It may be preferable to use a single valve arrangement rather than multiple flow restrictors or multiple shut off valves to reduce complexity in control and to reduce parasitic losses in the fuel cell stack system.

Figure 3:
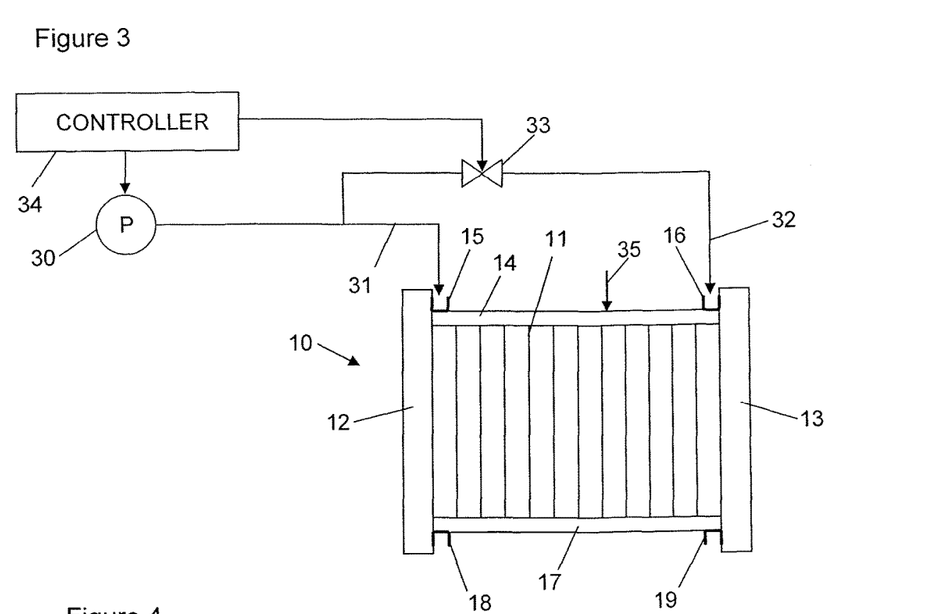
FIG. 3 is a schematic view of the fuel cell stack of FIG. 1 coupled for variable balance water delivery to the manifold.

FIG. 3 shows another arrangement of fuel cell stack assembly in which a cooling water pump 30 is coupled to the fuel cell stack 10 by way of a first flow path 31 and a second flow path 32 and a variable flow restrictor 33. The first flow path 31 is coupled to the first inlet 15 to deliver cooling water into the manifold 14 at a first end, and the second flow path 32 is coupled to the second inlet 16 to deliver cooling water into the manifold 14 at the other end. The variable flow restrictor 33 is operative to vary the impedance to water flow to the manifold 14 via flow path 32. A controller 34 is operable to periodically vary the flow rate through flow restrictor 33 so that the proportion of cooling water entering the manifold 14 at each end varies. The control of the flow restrictor 33 by the controller 34 may be performed according to any suitable algorithm, e.g. on a timed basis, and/or as a function of cooling flow rate required by the fuel cell stack 10 as discussed above in connection with the arrangement of FIG. 2.

In this way, the assembly of FIG. 3 generally provides a flow control assembly 31, 32, 33, 34 which is configured to periodically modify the relative flow rates through the first and second inlets 15, 16. In a first configuration, when the flow restrictor 33 offers high impedance to flow, most coolant water is supplied to the manifold 14 via inlet 15 and only a small proportion of the coolant water is supplied to the manifold 14 via inlet 16. In another configuration, when the flow restrictor 33 offers low impedance to flow, a large proportion of the coolant water is supplied to the manifold 14 via inlet 16.

If the impedance to flow of the first flow path 31 and the second flow path 32 are equal when the flow restrictor 33 is wide open, the ratio of flow to first inlet/second inlet will range between 100% and 50%. However, if the first flow path 31 is arranged with a different (e.g. much higher) impedance to flow than the flow path 32 when the flow restrictor is wide open, a greater range of flow ratios becomes possible under the control of the flow restrictor 33. A difference in flow impedance between the first and second flow paths 31, 32 can be provided by differences in the cross-sectional area orthogonal to the direction of flow through the first and second flow paths, differences in the tortuousness of the flow path, or a difference in pipe diameters, orifice diameters and/or pipe lengths, or introduction of one or more filters into one or more of the flow paths.

Varying the relative flow rates through the first and second inlets 15, 16 (i.e. varying the ratio of flow to the first inlet/second inlet) produces, as a consequence, a movement of the "balance point" (or "fluidic stagnation point") within the manifold, indicated on FIG. 3 as position 35. This is the position in the manifold where the coolant water generally changes from rightward flow direction from inlet 15 to leftward flow direction from inlet 16. In other words, the fuel cells 11 in the stack 10 that are to the left of the balance point 35 are generally supplied from the first inlet 15 and the fuel cells 11 in the stack 10 that are to the right of the balance point 35 are generally supplied from the second inlet 16. Thus, by periodically varying the impedance to flow using flow restrictor 33, the flow control assembly 31, 32, 33, 34 is configured to periodically vary a water pressure balance point within the manifold between the first inlet and the second inlet. In a general aspect, the flow control assembly is able to bias the water delivery towards either the first or second inlets.

A similar result can be achieved with two variable flow restrictors, one in each of flow paths 31 and 32. A similar result can be achieved with two variable flow restrictors, one in flow path 32 and one in the portion of flow path that is common to both flow path 31 and flow path 32. In this latter configuration, changes in the ratio of flow impedance for flow path 1+flow path 2 to flow path 2 alone will enable the water pressure balance point 35 to be varied. The choice of which flow path 31, 32 is selected for a variable flow restrictor is optional. In a general aspect, the apparatus described above may be configured to adjust the impedance to coolant fluid flow between the pump 30 and at least one of the inlets 15, 16. In a general aspect, the arrangements described above can be configured to periodically alternate the dominant flow of coolant fluid through the first and second inlets 15, 16.

Figure 4:
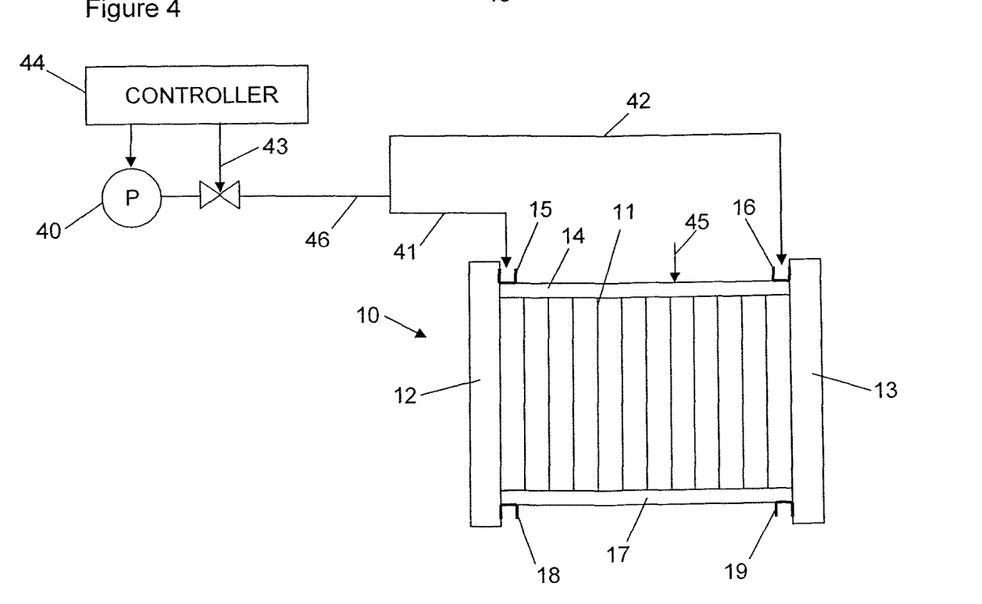
FIG. 4 is a schematic view of the fuel cell stack of FIG. 1 coupled for variable balance water delivery to the manifold.

FIG. 4 shows another arrangement of fuel cell stack assembly in which a cooling water pump 40 is coupled to the fuel cell stack 10 by way of a first flow path 41 and a second flow path 42. An optional variable flow restrictor 43 may be provided in the section of flow path 46 common to the first and second flow paths 41, 42 that leads to the pump 40. The first flow path 41 is coupled to the first inlet 15 to deliver cooling water into the manifold 14 at a first end, and the second flow path 42 is coupled to the second inlet 16 to deliver cooling water into the manifold 14 at the other end. In this arrangement, the first and second flow paths 41, 42 are formed with different impedances to flow, e.g. by using different pipe diameters, different diameter orifices in the flow paths, different cross-sectional areas orthogonal to flow direction, differences in the tortuousness of the flow paths and/or different pipe lengths, or introduction of one or more filters into one or more of the flow paths. A controller 44 is operable to vary the flow rate of water delivered to the manifold through both the first flow path 41 and the second flow path 42. Because the impedance to flow in the two flow paths 41, 42 is different, increases and decreases in total flow rate will result in different proportions of coolant flow being delivered via the first and second flow paths. This, in turn, will change the balance point 45 in the manifold. Thus, as the cooling water flow to the stack 10 is varied periodically, the relative flow rates through the first and second inlets will be varied. This periodic variation in cooling water flow may be effected as part of the normal fuel cell stack control system ensuring correct humidification and cooling as a function of varying electrical load on the stack.

The assembly of FIG. 4 generally provides a flow control assembly 41-44 which is configured to periodically modify the relative flow rates through the first and second inlets 15, 16. The total flow rate can be controlled by one or more of various mechanisms, including pump speed, a variable flow restrictor 43 in the common flow path 46, or by operational parameters of the fuel cell itself, such as gas flow through the stack, operating temperature and current demand. Feedback can be provided by, for example, measurement of such operational parameters, cell performance and/or stack voltage or one or more individual cell voltages, and the control algorithm may use these measurements to determine the required flow control. Periodic modification of relative flow rates could be implemented based on fixed or variable time periods, or on total volumes of fluid flow. For example, relative flow rate could be changed after a fixed volume (e.g. 5000 liters) of coolant, or a fixed time (e.g. 500 hours) of operation.

An advantage of providing a varying balance point 45 using the configuration of FIG. 4 is that the position of the balance point can be determined by fixed different geometries of the first and second flow paths 41, 42 and the total flow rate provided by the pump 40. The fixed different geometries of the first and second flow paths require no moving parts or adjustable valves or flow restrictors. The total flow rate provided by the pump can be provided by a common flow control device which is in any event required for maintaining the appropriate quantity of coolant flow to the stack.

FIGS. 5 to 8 show arrangements of fuel cell stack assembly particularly adapted to ensuring that an appropriate level of coolant flow occurs even at very low flows, e.g. when the electrical current demand on the fuel cell is very low, and in particular when the water flow may fall below a threshold at which the pump can reliably operate.

Figure 5:
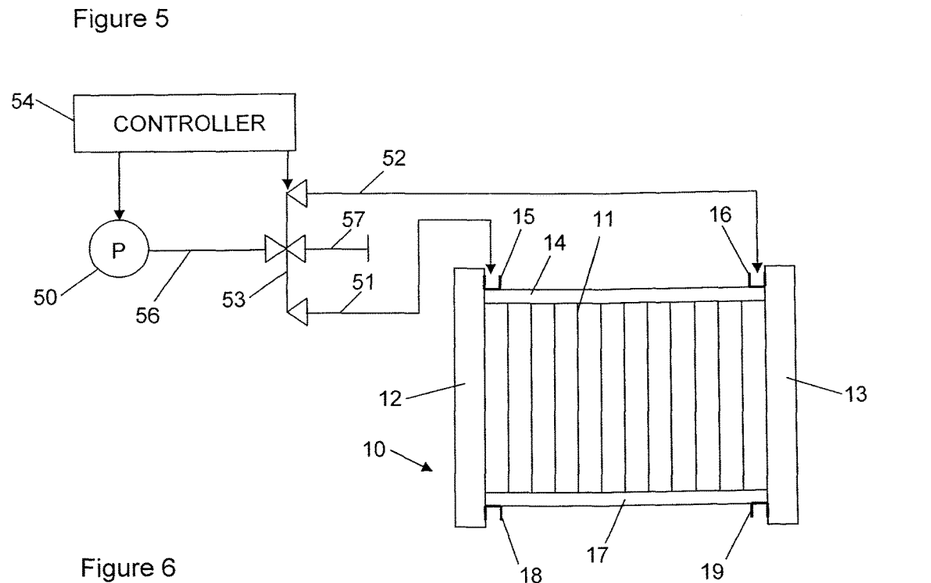
FIG. 5 is a schematic view of the fuel cell stack of FIG. 1 coupled for two-way and intermittent water delivery to the manifold.

FIG. 5 shows an arrangement of fuel cell stack assembly in which a cooling water pump 50 is coupled to the fuel cell stack 10 by way of a first flow path 51 and a second flow path 52, a common flow path 56 and a multi-way valve 53. The first flow path 51 is coupled to the first inlet 15 to deliver cooling water into the manifold 14 at a first end, and the second flow path 52 is coupled to the second inlet 16 to deliver cooling water into the manifold 14 at the other end. The multi-way valve 53 is operative to select one or other of the flow paths 51, 52 for delivery of water into the manifold 14. A controller 54 is operable to periodically switch the multi-way valve 53 so that cooling water enters the manifold 14 from alternating ends. To this extent, the arrangement is similar to that of FIG. 2. However, in the arrangement of FIG. 5, a third position of the multi-way valve 53 switches the input of common flow path 56 to a dead end 57 thereby stopping flow. The switching of the multi-way valve 53 by the controller 54 may be performed according to any suitable algorithm, e.g. on a timed basis, and/or as a function of cooling flow rate required by the fuel cell stack 10.

The assembly of FIG. 5 generally provides a flow control assembly 51-56 which is configured to periodically modify the relative flow rates through the first and second inlets 15, 16. In a first configuration, when the multi-way valve 53 diverts coolant water through the first flow path 51, the flow rate through the first inlet 15 may be 100% of total flow, while the flow rate through the second inlet 16 may be 0% of total flow. When the multi-way valve 53 diverts coolant water through the second flow path 52, the flow rate through the first inlet 15 may be 0% of total flow, while the flow rate through the second inlet 16 may be 100% of total flow. In this way, the low coolant flow end of the manifold is periodically reversed. In the third position of the valve 53, coolant water may be diverted into the dead end 57 thereby stopping flow.

More generally, the assembly of FIG. 5 provides a valve assembly 53 disposed between the pump 50 and the manifold 14 which is configured to periodically reverse the direction of flow through at least one of the first inlet 15 and the second inlet 16, and provide a third option of stopping flow to the fuel cell stack. A similar result of reversing flows can be achieved with a shut-off valve in each of the first and second flow paths 51, 52 operating together (in opposition). A similar result can be achieved with a variable flow restrictor positioned in each of the first and second flow paths 51, 52 operating together (in opposition). The multi-way valve 53 operating in conjunction with the dead end 57 allows the controller 54 to periodically block flow to the fuel cell stack. This arrangement enables the pump 50 to be operated at a known reliable set point where a fixed or metered water flow rate is guaranteed, even when the flow rate is actually too high for the prevailing conditions of the fuel cell stack 10. In this case, the water flow to the stack 10 is effectively pulsed to achieve the desired flow rate on a time-averaged basis when the stack is operated at low load. When the desired flow rate for the stack is sufficiently high, the water flow can be delivered continuously via flow path 51 or 52 or both in alternating fashion, as discussed previously. The controller 54 is used to determine the period for operation of the multi-way valve 53 in each of the possible three output positions.

Thus, in a general sense, the arrangement of FIG. 5 exemplifies a flow control assembly 51-57 between the pump 50 and the manifold 14 which is adapted to periodically interrupt the flow path between the pump and the manifold such that the fluid coolant is delivered to the manifold intermittently. This enables maintenance of a pulsed water flow to the manifold at a time-averaged flow rate that is lower than the constant flow rate dictated by the pump set point, and is particularly effective when the minimum set point of the pump provides a water flow rate higher than the desired flow rate for the prevailing conditions in the fuel cell stack 10.

The delivery of a pulsed water flow at a time-averaged flow rate that is lower than the constant flow rate dictated by the pump set point can be achieved in a stack arrangement having only a single inlet 15 to a water manifold 14, using a multi-way valve with only two outputs. For example, use of a multi-way valve with one input and two outputs in place of the multi-way valve 53 with one input and three outputs shown in FIG. 5 and omission of flow path 52 provides this arrangement.

Figure 6:
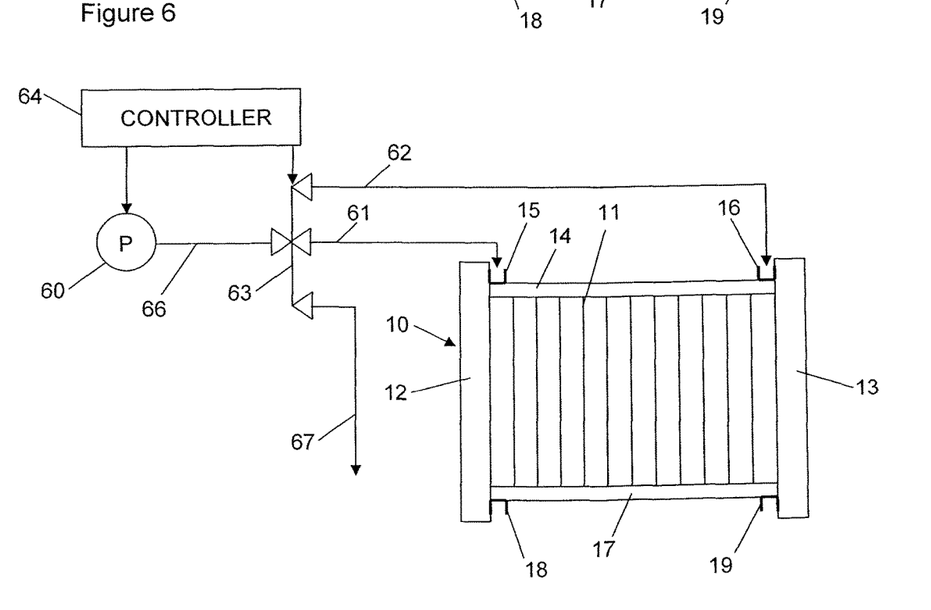
FIG. 6 is a schematic view of the fuel cell stack of FIG. 1 coupled for two-way and intermittent water delivery to the manifold.

Some water pumps may not perform optimally when exposed to pressure spikes caused by switching the multi-way valve (e.g. valve 53) to a no-flow position (e.g. dead end 57), in order to achieve the required time-averaged flow target. In this case, it is possible to instead divert at least some of the water from the pump to a drain pipe. FIG. 6 shows an arrangement similar to that of FIG. 5 in which the dead end 57 is replaced with such a drain 67.

In FIG. 6, cooling water pump 60 is coupled to the fuel cell stack 10 by way of a first flow path 61 and a second flow path 62, a common flow path 66 and a multi-way valve 63. The first flow path 61 is coupled to the first inlet 15 to deliver cooling water into the manifold 14 at a first end, and the second flow path 62 is coupled to the second inlet 16 to deliver cooling water into the manifold 14 at the other end. The multi-way valve 63 is operative to select one or other of the flow paths 61, 62 for delivery of water into the manifold 14. A controller 64 is operable to periodically switch the multi-way valve 63 so that cooling water enters the manifold 14 from alternating ends. A third position of the multi-way valve 63 switches the input of common flow path 66 to a drain 67 thereby stopping flow to the stack but maintaining flow from the pump 60 to a drain or reservoir. In this way, pressure spikes at the pump are avoided and the pump can maintain its set point flow at all times. The switching of the multi-way valve 63 by the controller 64 may be performed according to any suitable algorithm, e.g. on a timed basis, and/or as a function of cooling flow rate required by the fuel cell stack 10. In other respects, the arrangement of FIG. 6 is similar to that of FIG. 5, and similar variants are possible as described in connection with FIG. 5.

The multi-way valve 63 operating in conjunction with the drain 67 allows the controller 64 to periodically block flow to the fuel cell stack. This arrangement also enables the pump 60 to be operated at a known reliable set point where a fixed or metered water flow rate is guaranteed, even when the flow rate is actually too high for the prevailing conditions of the fuel cell stack 10. In this case, the water flow to the stack 10 is effectively pulsed to achieve the desired flow rate on a time-averaged basis when the stack is operated at low load. When the desired flow rate for the stack is sufficiently high, the water flow can be delivered continuously via flow path 61 or 62 or both in alternating fashion, as discussed previously. The controller 64 is used to determine the period for operation of the multi-way valve in each of the possible three output positions.

Thus, in a general sense, the arrangement of FIG. 6 exemplifies a flow control assembly 61-67 between the pump 60 and the manifold 14 which is adapted to periodically interrupt the flow path between the pump and the manifold such that the fluid coolant is delivered to the manifold intermittently. This enables maintenance of a pulsed water flow to the manifold at a time-averaged flow rate that is lower than the constant flow rate dictated by the pump set point and is particularly effective when the minimum set point of the pump provides a water flow rate higher than the desired flow rate for the prevailing conditions in the fuel cell stack 10.

The delivery of a pulsed water flow at a time-averaged flow rate that is lower than the constant flow rate dictated by the pump set point can be achieved in a stack arrangement having only a single inlet 15 to a water manifold 14, using a multi-way valve with only two outputs. For example, use of a multi-way valve with one input and two outputs in place of multi-way valve 63 with one input and three outputs shown in FIG. 6 and omission of flow path 62 provides this arrangement.

The drain 67 could form part of a recirculation loop in which some or all of the unused water is directed back to the pump inlet, either directly or via a suitable reservoir. Alternatively, the drain 67 can lead to a discharge outlet from the system.

The drain arrangement can be combined with any of the embodiments described in connection with FIGS. 2 to 4 if a pulsed flow is required.

Figure 7:
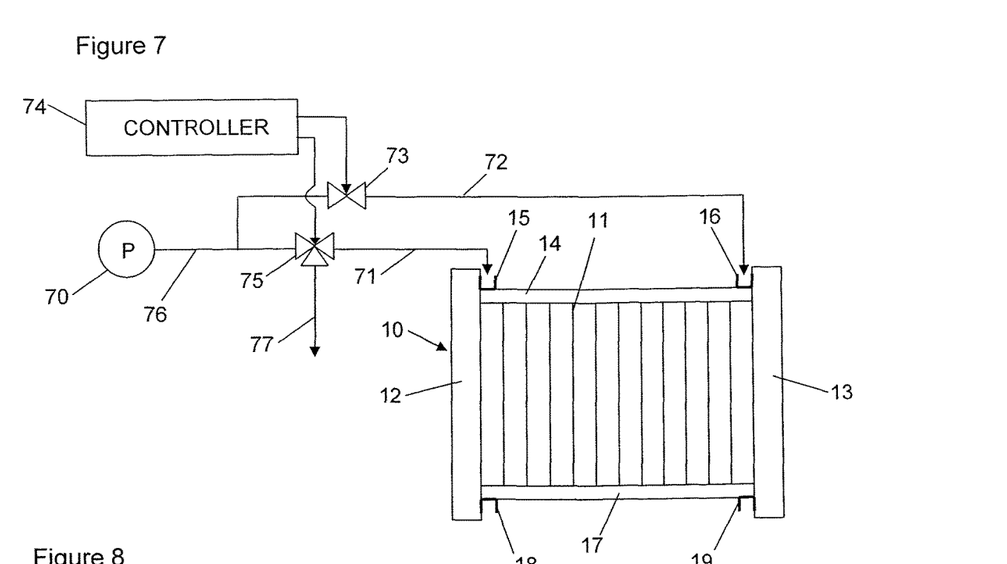
FIG. 7 is a schematic view of the fuel cell stack of FIG. 1 coupled for two-way and intermittent water delivery to the manifold.

In order to purge liquid water through the system, any one of the flow paths 21, 22, 31, 32, 41, 42, 51, 52, 61, 62 could also be provided with a switchable purge outlet. An example based on the arrangement of FIG. 3 is shown in FIG. 7. In this arrangement cooling water pump 70 is coupled to the fuel cell stack 10 by way of a first flow path 71 and a second flow path 72 and a variable flow restrictor 73. The first flow path 71 is coupled to the first inlet 15 to deliver cooling water into the manifold 14 at a first end, and the second flow path 72 is coupled to the second inlet 16 to deliver cooling water into the manifold 14 at the other end. The variable flow restrictor 73 is operative to vary the impedance to water flow to the manifold 14 via flow path 72. A controller 74 is operable to periodically vary the flow rate through flow restrictor 73 so that the proportion of cooling water entering the manifold 14 at each end varies. The control of the flow restrictor 73 operates in corresponding manner to that described in connection with FIG. 3. A multi-way valve 75 is provided in the first flow path 71 and is coupled to a drain 77. By opening variable flow restrictor 73 to full or high flow, and switching the multi-way valve 75 such that first flow path 71 is connected to drain 77, water can be purged through manifold 14.

Figure 8:
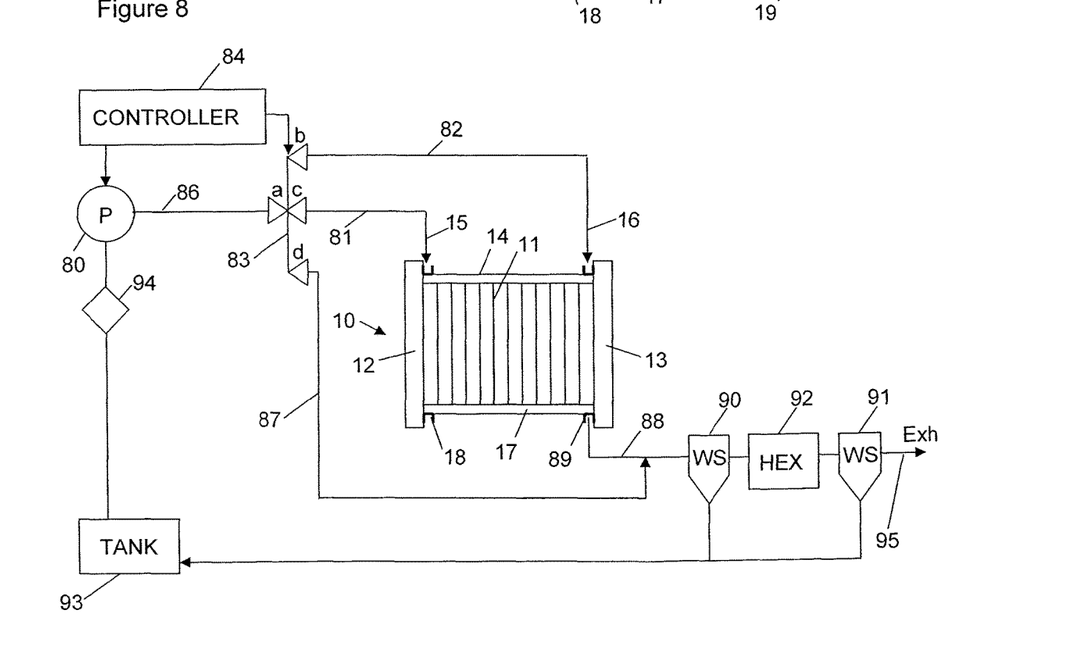
FIG. 8 is a schematic view of the fuel cell stack of FIG. 1 coupled for two-way, intermittent and recirculating water delivery to the manifold.

FIG. 8 shows a further arrangement of fuel cell stack assembly similar to that described in connection with FIGS. 5 and 6 and further including a water recirculation system. A cooling water pump 80 is coupled to the fuel cell stack 10 by way of a first flow path 81 and a second flow path 82, a common flow path 86 and a multi-way valve 83. The first flow path 81 is coupled to the first inlet 15 to deliver cooling water into the manifold 14 at a first end, and the second flow path 82 is coupled to the second inlet 16 to deliver cooling water into the manifold 14 at the other end. The multi-way valve 83 is operative to select one or other of the flow paths 81, 82 for delivery of water into the manifold 14. A controller 84 is operable to periodically switch the multi-way valve 83 so that cooling water enters the manifold 14 from alternating ends. To this extent, the arrangement is similar to that of FIG. 2. The third position of the multi-way valve 83 switches the input of common flow path 86 to a stack bypass conduit 87 thereby diverting water flow from the stack 10. The switching of the multi-way valve 83 by the controller 84 may be performed according to any suitable algorithm, e.g. on a timed basis, and/or as a function of cooling flow rate required by the fuel cell stack 10. The stack bypass conduit 87 joins a recirculation loop 88 connected to a cathode exhaust outlet 89. The recirculation loop 88 comprises a pair of water separators 90, 91 for recovering water and a heat exchanger 92. The recovered water from water separators 90, 91 is directed to a water tank 93. Water tank 93 is coupled to the inlet of pump 80 via a filter 94. Gaseous cathode exhaust is expelled via exhaust line 95.

A number of modes of operation are possible based on the control of multi-way valve 83. Multi-way valve 83 has four ports labelled a to d in FIG. 8 which can be configured according to the following table.

| | Port | | | |
|---|---|---|---|---|
| Mode | a | b | c | d | Operation mode |
| 1 | open | closed | open | closed | Water feed to first flow path |
| 2 | open | closed | closed | open | Pause: no water to stack |
| 3 | open | open | closed | closed | Water feed to second flow path |
| 2 | open | closed | closed | open | Pause: no water to stack |
| 4 | open | open | open | closed | Water feed to first and second flow paths |

A typical operation may switch between the various modes. For example, in a low flow condition where the stack water flow demand is lower than the minimum desirable set point of the pump, the controller 84 may sequence through modes 1→2→→3→2→1→2→3→2 indefinitely. In another example, for higher flows where bypass is not required, the controller may sequence through modes 1→3→1→3→1→3 indefinitely. In another example, at high flows, the controller may hold mode 4 indefinitely, or cycle through modes 1→3→4→1→3→4.

The arrangement of FIG. 8 can also be adapted with flow restriction arrangements discussed in connection with FIGS. 3 and 4. The arrangement of FIG. 8 can also be adapted to use a multi-way valve with one fewer outputs and omit one of the first or second flow paths 81, 82 if only a single flow path into the water manifold 14 is required.

The arrangements described in connection with FIGS. 1 to 8 can also be adapted with other features. For example, the number of flow paths 15, 16 can be increased beyond two, so that water is pumped into the manifold 14 in multiple locations along the length. The additional flow paths may be coupled to existing flow paths in groups using common valves or flow restrictors or may each have dedicated flow restrictors or valves. The first and second inlets 15, 16 need not be positioned exactly at the ends of the water manifold, although avoidance of dead-ended or low flow sections of the manifold is preferably avoided. Therefore, positioning the first and second inlets 15, 16 at least proximal to their respective ends of the manifold 14 is desirable. The use of modes of operation to control the water balance point (e.g. point 35 in FIG. 3) may be used only periodically or when water flow required through the fuel cell stack is lower than a predetermined threshold. Providing variable relative flow rates to each of two flow paths 15, 16 could also be provided by controlling flow from two pumps respectively coupled to the two flow paths rather than using a single pump and valve assembly. In such an arrangement, the controller may be configured to operate the first and second pumps at variable, differential rates.

Periodic bidirectional water flow through the manifold 14 can have the beneficial effect that blockages may be less likely to occur in the pipes. The disturbance of switching or pulsing of water flows may also tend to enhance this beneficial effect. Frequent moving of the balance point 35 (or "stagnation point") also may tend to enhance this beneficial effect. Filters may be introduced into selected ones of the flow paths leading to the manifold inlets.

Any suitable periodicity of switching or pulsing of water flows may be selected, to provide such benefits as reduction in problems caused by stagnation zones, corrosion risk and bacteria build-up. Suitable periodicities may range from a few seconds to hundreds of hours, for example.

Other embodiments are intentionally within the scope of the accompanying claims.

The invention claimed is:
1. A fuel cell stack assembly comprising:
a plurality of cells each having a fluid coolant conduit;
a coolant feed manifold having a first inlet and a second inlet and further being coupled to each fluid coolant conduit for distribution of fluid coolant within each cell;
a pump coupled for delivery of fluid coolant to the coolant feed manifold through the first and second inlets; and
a flow control assembly configured to periodically modify the relative flow rates of fluid coolant through the first and second inlets; and,
including a switchable drain between the pump and at least one of the first and second inlets configured to periodically divert at least a portion of the coolant fluid provided by the pump to a drain; and, in which the switchable drain comprises a multi-way valve disposed in a flow path between the pump and the first and second inlets, the multi-way valve being configured to switch between coupling i) the first inlet ii) the second inlet and iii) a drain line, to the pump.

2. The fuel cell stack assembly of claim 1 in which the flow control assembly is configured to periodically vary a fluid pressure balance point within the manifold between the first inlet and the second inlet.

3. The fuel cell stack assembly of claim 1 in which the flow control assembly includes at least a first variable flow restrictor between the pump and the first inlet, the first variable flow restrictor configured to adjust the impedance to fluid coolant flow between the pump and the first inlet.

4. The fuel cell stack assembly of claim 3 in which the flow control assembly includes a second variable flow restrictor, the second variable flow restrictor configured to adjust the impedance to fluid coolant flow between the pump and the second inlet.

5. The fuel cell stack assembly of claim 1 in which the flow control assembly comprises a multi-way valve disposed between the pump and the manifold which is configured to periodically switch between directing fluid coolant through the first inlet and through the second inlet.

6. The fuel cell stack assembly of claim 1 in which the flow control assembly is adapted to periodically reconfigure flow paths between the pump and the first and second inlets between a first configuration in which fluid flow from the pump is predominantly directed to the first inlet and a second configuration in which fluid flow from the pump is predominantly directed to the second inlet.

7. The fuel cell stack assembly of claim 6 in which the flow control assembly comprises at least two variable flow restrictors configured to periodically alternate the dominant flow of coolant fluid through the first and second inlets.

8. The fuel cell stack assembly of claim 1 in which the flow control assembly comprises:
   a first flow path, between the pump and the first inlet, having a first impedance to coolant flow;
   a second flow path, between the pump and the second inlet, having a second impedance to coolant flow, in which the first impedance is different to the second impedance; and
   a controller for varying the overall flow volume of water delivered to the manifold through both the first and second flow paths such that a water pressure balance point within the manifold is varied between the first inlet and the second inlet.

9. The fuel cell stack assembly of claim 8 in which the controller for varying the overall volume of water delivered to the manifold comprises any one or more of:
   a pump controller for varying the pump speed;
   a variable flow restrictor in a portion of flow path which is common to both the first flow path and the second flow path; and
   a stack controller controlling operational parameters of the fuel cell stack.

10. The fuel cell stack assembly of claim 8 in which at least one of the first and second impedances is variable by a variable flow restrictor.

11. The fuel cell stack assembly of claim 1 in which the first and second inlets are respectively proximal to a first end and a second end of the fuel cell stack.

12. The fuel cell stack of claim 1 in which the drain is coupled to a recirculation system for returning at least a portion of the coolant fluid to the pump.

13. A fuel cell stack assembly comprising:
   a plurality of cells each having a fluid coolant conduit;
   a coolant feed manifold having a first inlet and a second inlet and further being coupled to each fluid coolant conduit for distribution of fluid coolant within each cell;
   a pump coupled for delivery of fluid coolant to the coolant feed manifold through the first and second inlets; and
   a flow control assembly configured to periodically modify the relative flow rates of fluid coolant through the first and second inlets; and,
including a switchable drain between the pump and at least one of the first and second inlets configured to periodically divert at least a portion of the coolant fluid provided by the pump to a drain; and,
in which the switchable drain comprises a multi-way valve disposed in a flow path between the pump and at least one of the first and second inlets.

14. A fuel cell stack assembly comprising:
   a plurality of cells each having a fluid coolant conduit;
   a coolant feed manifold having a first inlet and a second inlet and further being coupled to each fluid coolant conduit for distribution of fluid coolant within each cell;
   a pump coupled for delivery of fluid coolant to the coolant feed manifold through the first and second inlets; and
   a flow control assembly configured to periodically modify the relative flow rates of fluid coolant through the first and second inlets; and,
   including a switchable drain between the pump and at least one of the first and second inlets configured to periodically divert at least a portion of the coolant fluid provided by the pump to a drain; and,
   in which the switchable drain comprises a multi-way valve disposed in a flow path between the pump and the first and second inlets, the multi-way valve being configured to switch between coupling i) the first inlet ii) the second inlet and iii) a drain line, to the pump in which the pump comprises a first pump and a second pump, the first pump coupled for delivery of fluid coolant to the coolant feed manifold through the first inlet and the second pump coupled for delivery of fluid coolant to the coolant feed manifold through the second inlet, and in which the flow control assembly comprises a controller configured to operate the first and second pumps at differential rates.

* * * * *